(12) United States Patent
Cho et al.

(10) Patent No.: US 12,110,446 B2
(45) Date of Patent: Oct. 8, 2024

(54) COMPOSITE MATERIAL AND HEAT DISSIPATION PART COMPRISING THE COMPOSITE MATERIAL

(71) Applicant: THE GOODSYSTEM CORP., Ansan-si (KR)

(72) Inventors: Meoung-whan Cho, Yongin-si (KR); Seog-woo Lee, Hwaseong-si (KR); Young-suk Kim, Suwon-si (KR)

(73) Assignee: THE GOODSYSTEM CORP., Ansan-si (KR)

( * ) Notice: Subject to any disclaimer, the term of this patent is extended or adjusted under 35 U.S.C. 154(b) by 0 days.

(21) Appl. No.: 17/991,012

(22) Filed: Nov. 21, 2022

(65) Prior Publication Data
US 2023/0183541 A1 Jun. 15, 2023

(30) Foreign Application Priority Data

Dec. 13, 2021 (KR) .......................... 10-2021-0178079

(51) Int. Cl.
| | |
|---|---|
| *C09K 5/14* | (2006.01) |
| *B22F 7/08* | (2006.01) |
| *C22C 9/00* | (2006.01) |
| *C22C 14/00* | (2006.01) |
| *C22C 26/00* | (2006.01) |

(52) U.S. Cl.
CPC .................. *C09K 5/14* (2013.01); *B22F 7/08* (2013.01); *C22C 9/00* (2013.01); *C22C 14/00* (2013.01); *C22C 26/00* (2013.01)

(58) Field of Classification Search
None
See application file for complete search history.

(56) References Cited

U.S. PATENT DOCUMENTS

2018/0328677 A1* 11/2018 Kim ..................... H01L 23/3735

FOREIGN PATENT DOCUMENTS

| CN | 101768706 A | * | 7/2010 |
|---|---|---|---|
| CN | 108774699 A | * | 11/2018 |
| CN | 114086016 A | * | 2/2022 |
| CN | 114411010 A | * | 4/2022 |
| CN | 115283671 A | * | 11/2022 |

OTHER PUBLICATIONS

Breval et al., "Development of Titanium Coatings on Particulate Diamond", Aug. 2000, J. Am. Ceram. Soc., vol. 83 Issue 8, pp. 2106-2108. (Year: 2000).*

* cited by examiner

*Primary Examiner* — Xiaobei Wang
(74) *Attorney, Agent, or Firm* — LEX IP MEISTER, PLLC

(57) ABSTRACT

The present invention relates to a composite material of a metal and a non-metal and a heat dissipation part composed of the composite material. More specifically, the present invention relates to a composite material including a structure in which diamond particles which have excellent thermal conductivity are dispersed in a metal matrix, and particularly, to a highly reliable composite material capable of maintaining excellent heat dissipation properties even in a use environment such as military, aviation, space, or the like to which severe thermal cycles are applied, and to a heat dissipation part including the composite material.

12 Claims, 13 Drawing Sheets

[FIG.1]
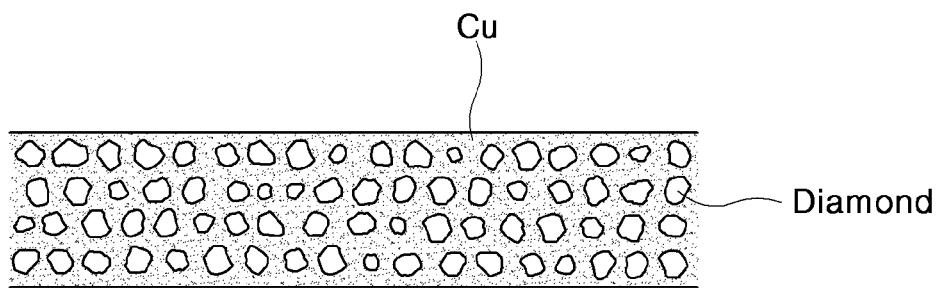
[FIG.2]
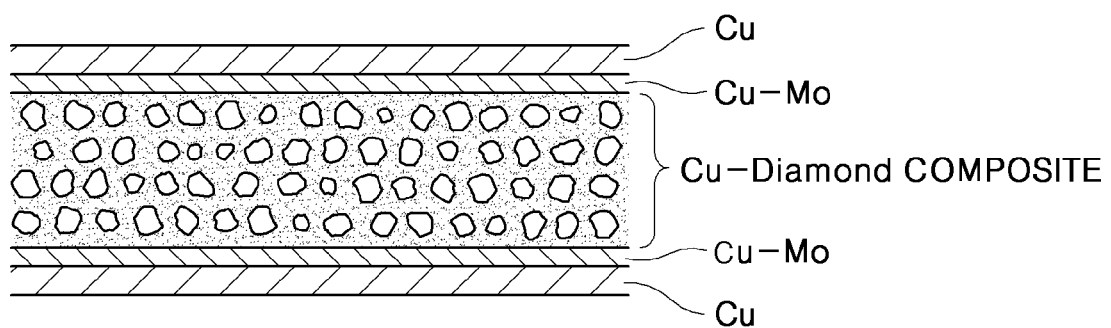

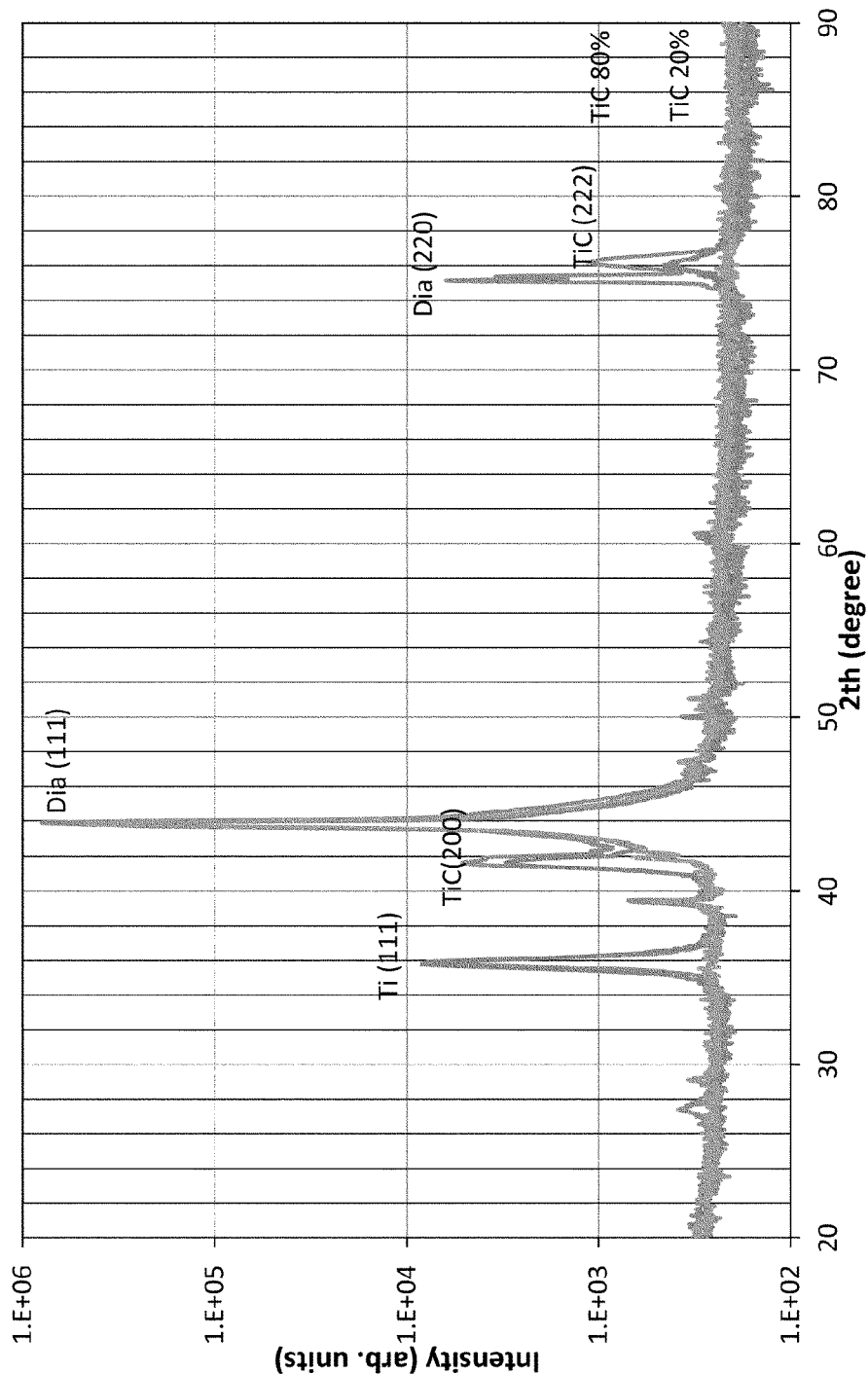
[FIG. 3]

[FIG.4]
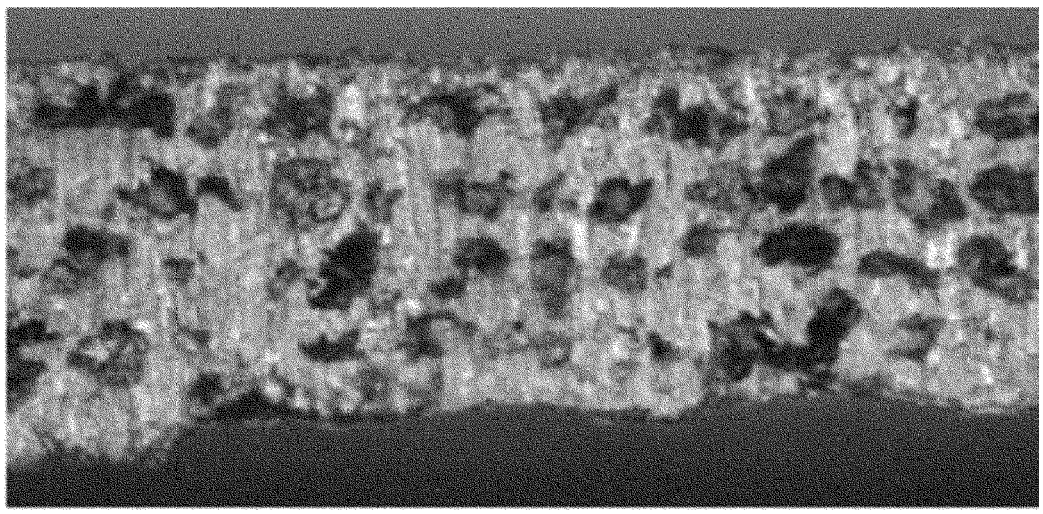

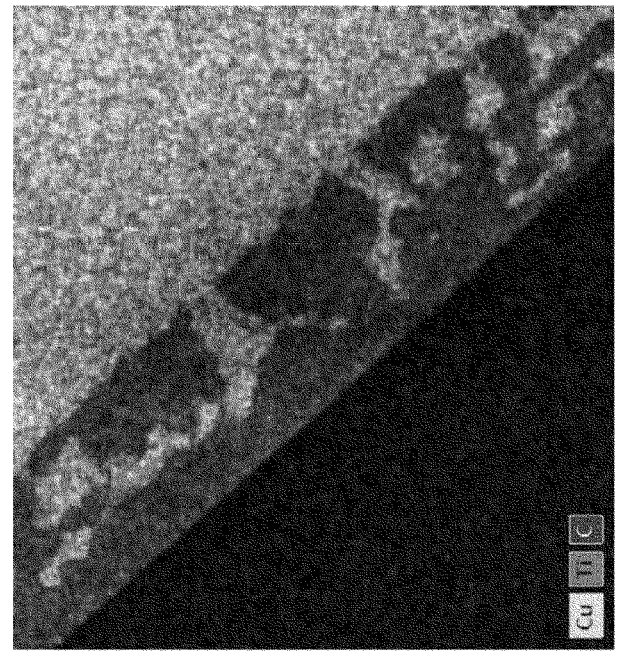
[FIG. 5B]
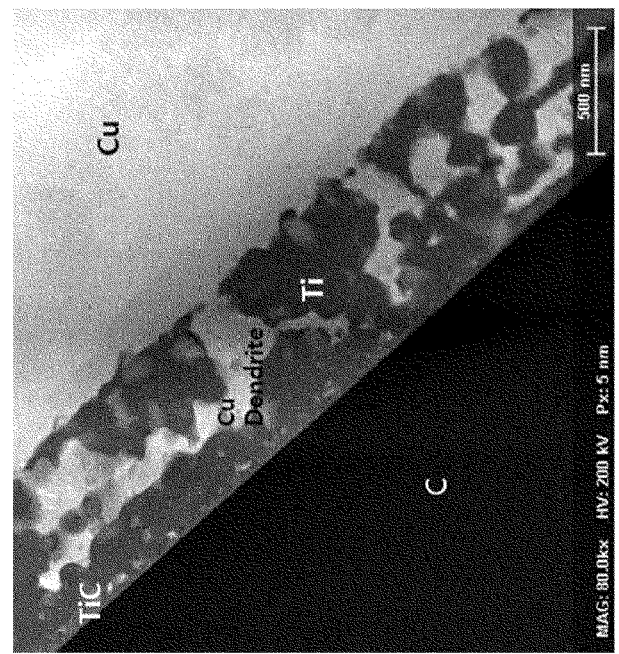
[FIG. 5A]

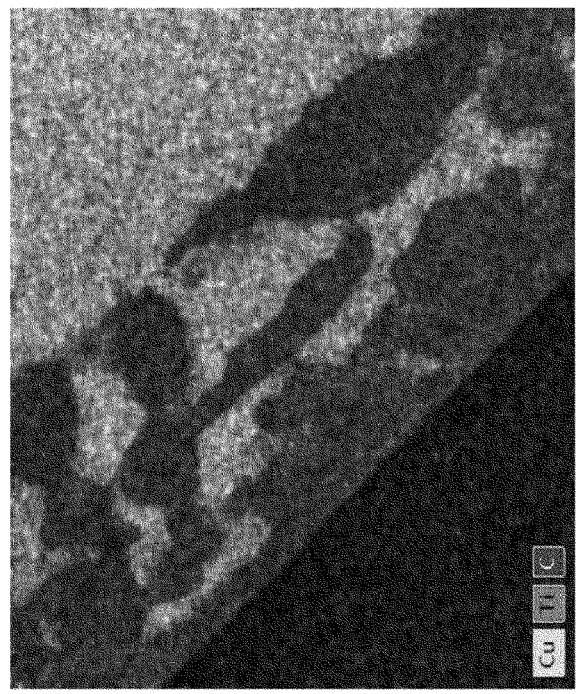
[FIG. 6B]
[FIG. 6A]

[FIG. 7B]
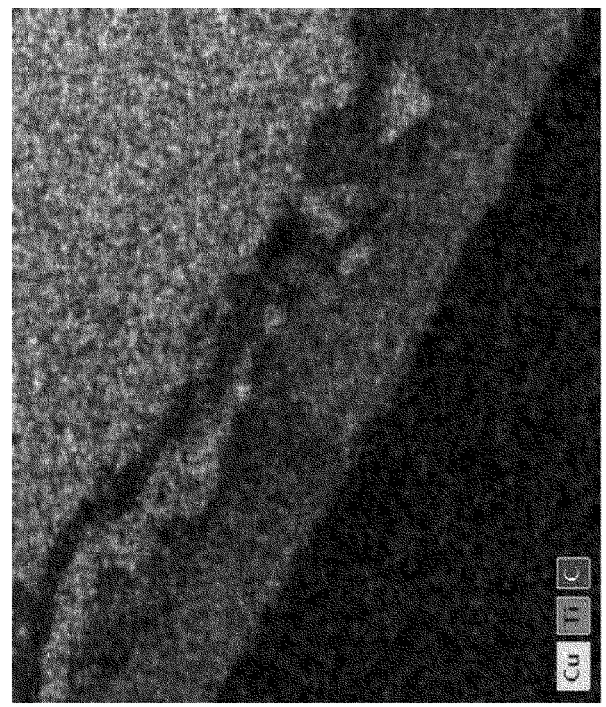
[FIG. 7A]

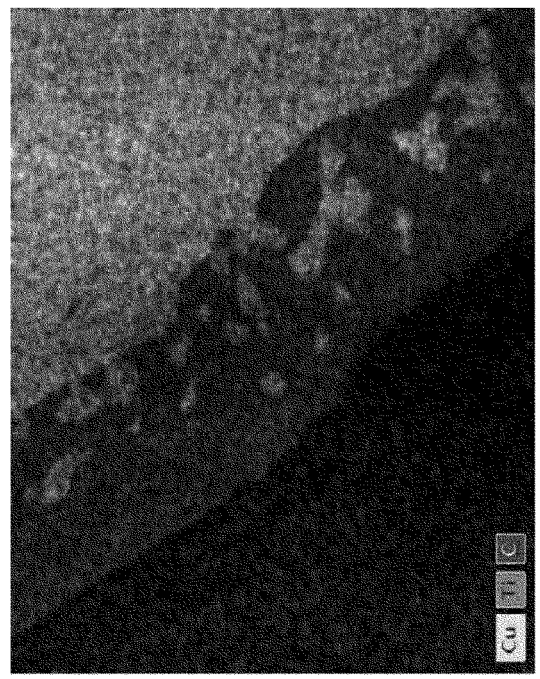
[FIG. 8B]
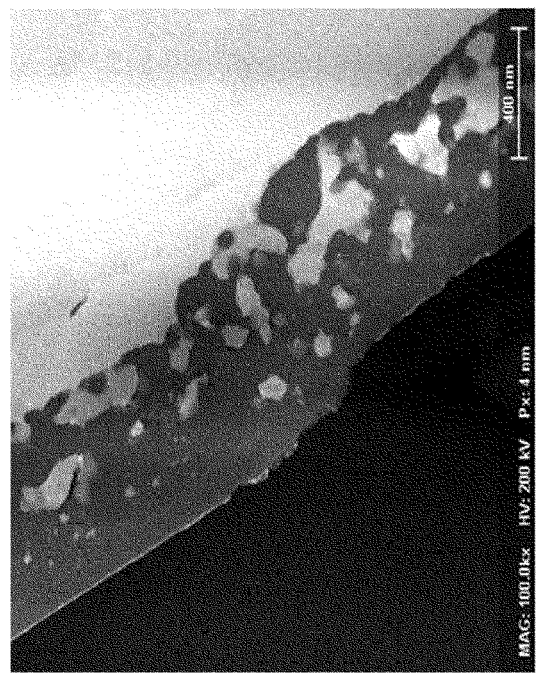
[FIG. 8A]

[FIG.9]
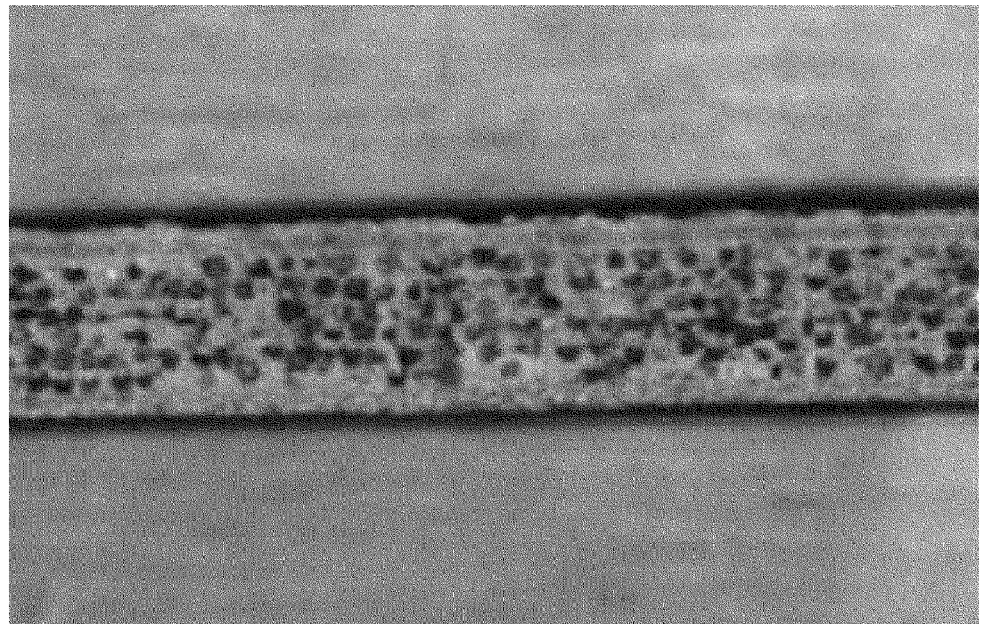
[FIG.10]
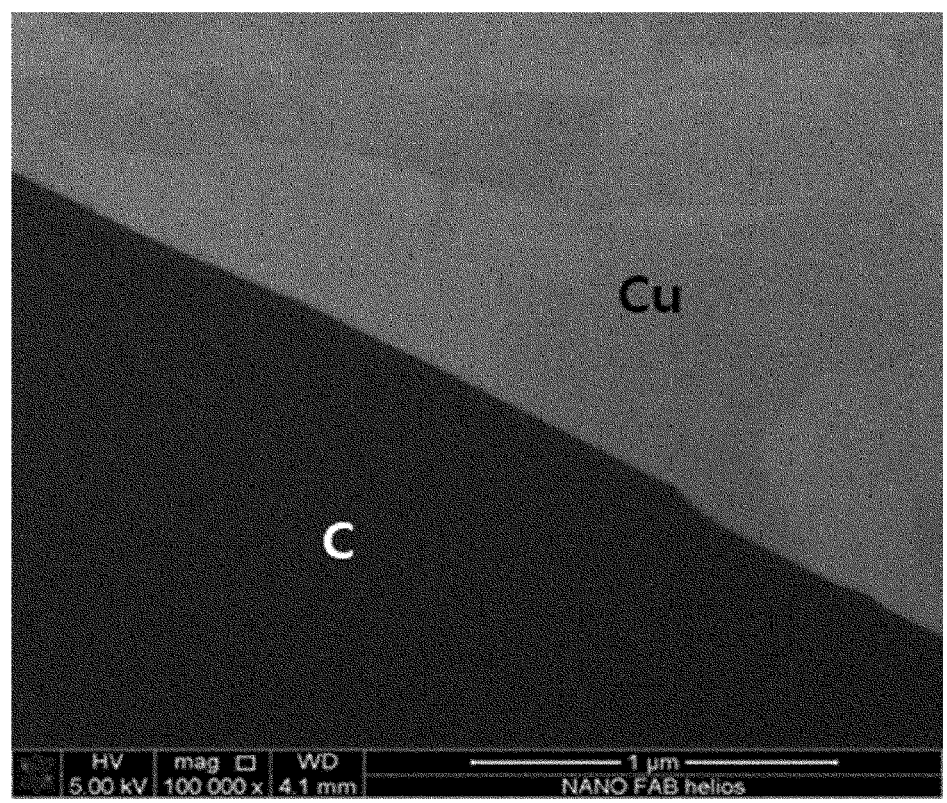

[FIG.11]
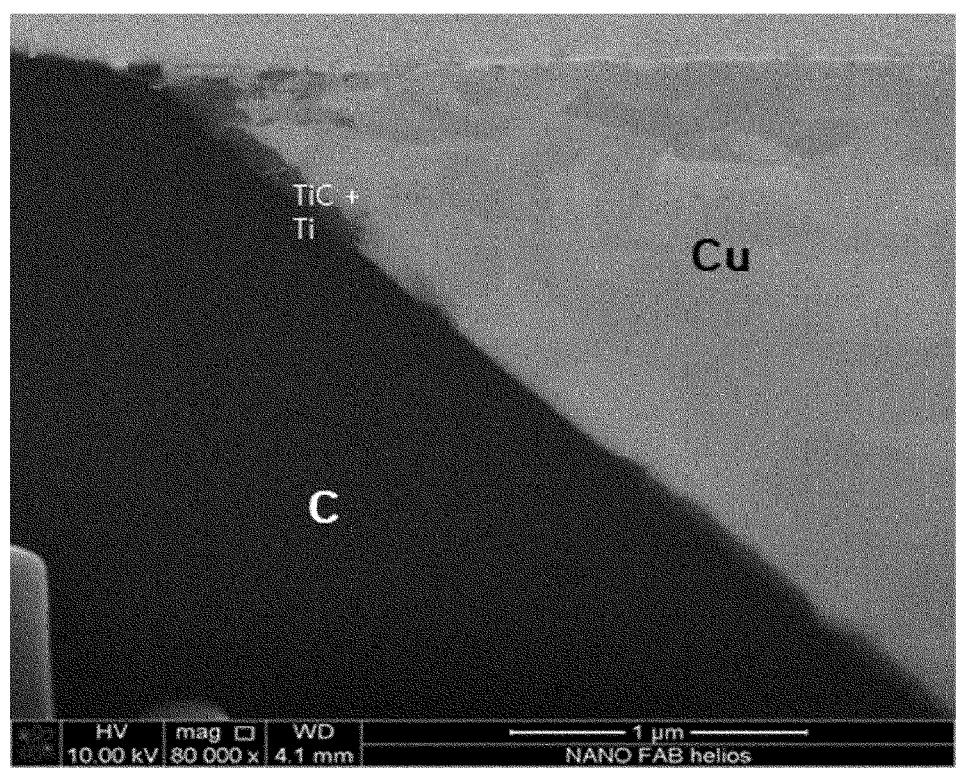

[FIG.12]
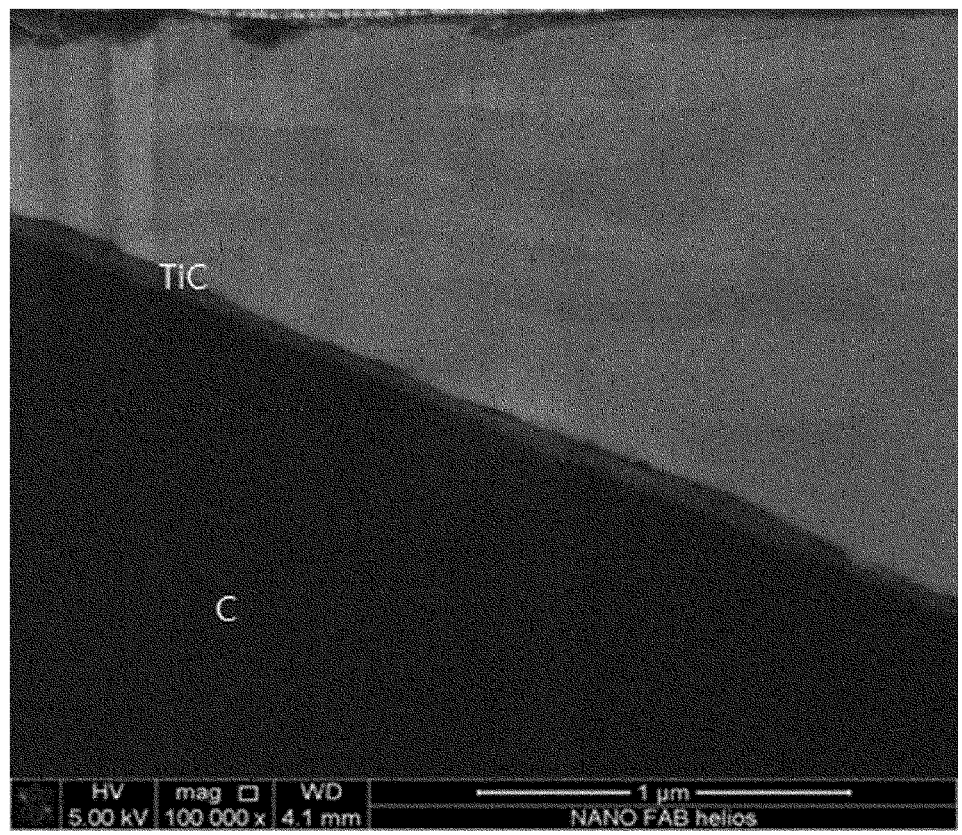

[FIG.13]
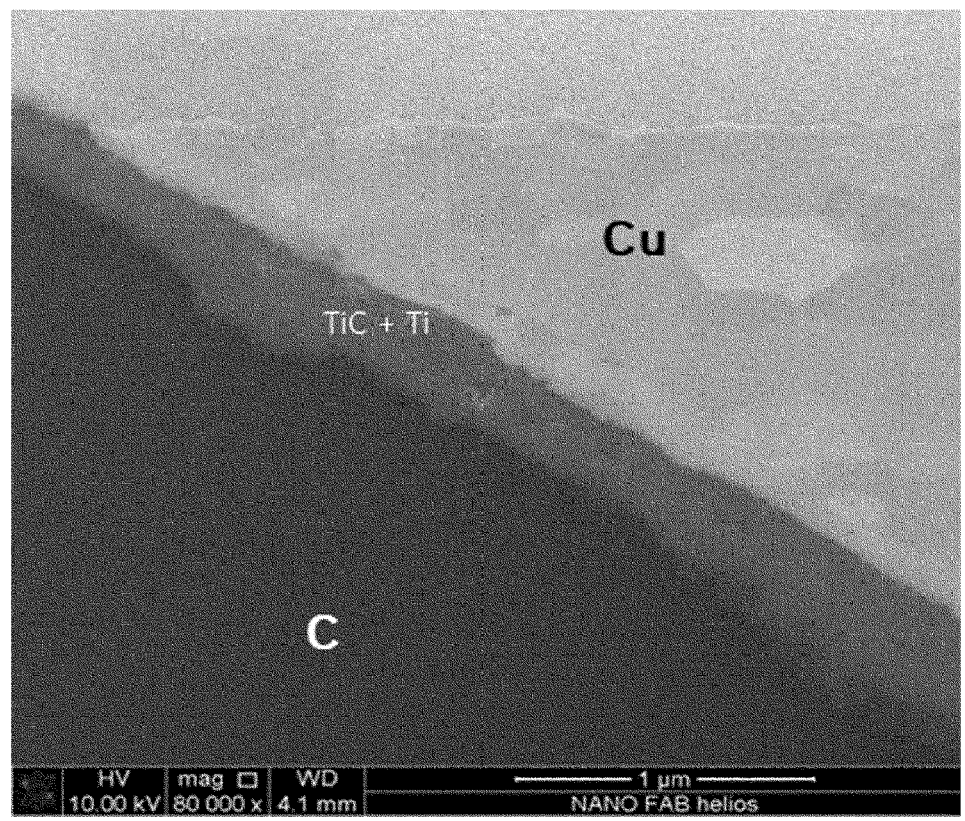

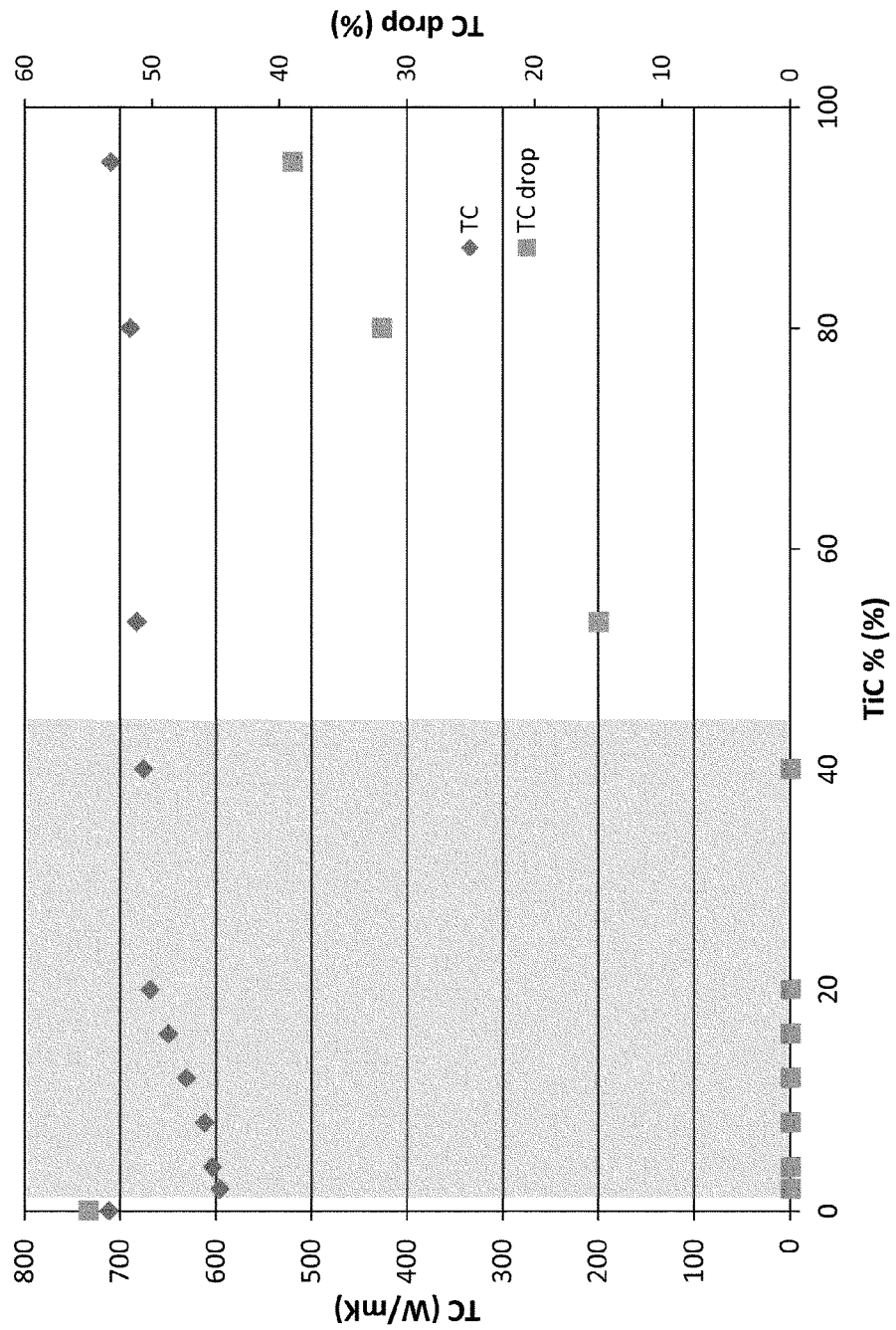
[FIG. 15]

COMPOSITE MATERIAL AND HEAT DISSIPATION PART COMPRISING THE COMPOSITE MATERIAL

BACKGROUND OF THE INVENTION

1. Field of the Invention

The present invention relates to a composite material of a metal and diamond and a heat dissipation part composed of the composite material. More specifically, the present invention relates to a composite material including a structure in which diamond particles which have excellent thermal conductivity are dispersed in a metal matrix, and particularly, to a composite material for a heat dissipation part, the composite material capable of maintaining excellent heat dissipation properties even in a use environment such as military, aviation, and space to which severe thermal cycles are applied, and to a heat dissipation part produced with the composite material.

2. Description of the Related Art

As the output of an electronic device increases, the amount of heat generated during the operation of a semiconductor device included in the electronic device tends to gradually increase. Accordingly, a heat dissipation part is installed in the semiconductor device to release heat generated in the semiconductor device to the outside. The heat dissipation part is required to have a high thermal conductivity and a thermal expansion coefficient which has a small difference from the thermal expansion coefficient of the semiconductor device.

In order to increase thermal conductivity and to maintain a low thermal expansion coefficient with a semiconductor device, a heat dissipation part made of a composite material in which particles having good thermal conductivity such as diamond or silicon carbide (SiC) are dispersed and composited in a metal matrix such as copper (Cu), silver (Ag), aluminum (Al), or magnesium (Mg) is used. As the composite material, various combinations such as a Cu-diamond composite material, a Ag-diamond composite material, a Al-diamond composite material, a Mg—SiC composite material, a Al—SiC composite material, and the like are known.

Among the above, a metal-based diamond composite material in which diamond particles having excellent thermal conductivity are dispersed in a metal matrix such as copper (Cu) is capable of implementing excellent thermal conductivity and a thermal expansion coefficient similar to that of a semiconductor device, and thus is attracting attention as a heat dissipation part for high-power devices.

However, a typical metal-based diamond composite material has a reliability problem in that the heat dissipation properties of the composite material are degraded in an environment in which repeated thermal cycles between low temperatures and high temperatures are applied. Particularly, there is a problem in that the heat dissipation properties are degraded within a short amount of time in a harsh use environment such as military, aviation, and space.

PRIOR ART DOCUMENT

Patent Document (Patent Document 0001) Japanese Patent Laid-Open Publication No. 2018-111883

SUMMARY OF THE INVENTION

The invention provides a composite material having high reliability with small degradation in heat dissipation properties even with a thermal cycle test of MIL-STD-883K-C, which is a condition for testing electronic devices for military and space operations, and capable of implementing a thermal expansion coefficient required for high-power semiconductor devices.

The invention also provides a heat dissipation part using the above-described composite material.

According to first aspect of the invention, there is provided a composite material having a metal matrix and a structure in which diamond particles are dispersed inside the metal matrix, wherein the metal matrix is composed of Cu, Ag, Al, Mg, or an alloy thereof, and the diamond particles are included at a volume ratio of 15% to 80%, and an interface layer including a composite structure of titanium (Ti) and a titanium carbide is formed in at least a portion between the metal matrix and the diamond particles, wherein a dendrite composed of the same metal as the metal matrix is formed in the composite structure of titanium (Ti) and a titanium carbide.

According to second aspect of the invention, there is provided a composite material including a first layer composed of copper (Cu) or a copper (Cu) alloy, a second layer formed on the first layer and composed of an alloy including copper (Cu) and molybdenum (Mo), a third layer formed on the second layer and composed of copper (Cu) or a copper (Cu) alloy, a fourth layer formed on the third layer and composed of an alloy including copper (Cu) and molybdenum (Mo), and a fifth layer formed on the fourth layer and composed of copper (Cu) or a copper (Cu) alloy.

According to third aspect of the invention, there is provided a heat dissipation part composed of the composite material according to the first aspect or the second aspect of the present invention.

Advantageous Effects

A composite material according to the present invention has a decrease in thermal conductivity properties of 10% or less even after a MIL-STD-883K-C standard test, which is one of conditions for testing electronic devices for military and space operations, thereby having significantly improved properties compared to those of a typical composite material.

In addition, a plate material made of the composite material according to the present invention is capable of implementing an excellent thermal conductivity of 400 W/mK or higher in a thickness direction.

In addition, the plate material made of the composite material according to the present invention is capable of implementing an excellent thermal conductivity of 400 W/mK or higher in a thickness direction which is required for high-power semiconductor devices. And at the same time, the plate material made of the composite material according to the present invention is capable of obtaining the controlled thermal expansion coefficient $3 \times 10^{-6}$/K to $13 \times 10^{-6}$/K at 25° C. to 200° C.

In addition, a heat dissipation part according to the present invention provides highly reliable heat dissipation properties not only in a general use environment but also in an environment in which a thermal cycle with a large temperature difference (150° C. or greater) is repeatedly applied.

BRIEF DESCRIPTION OF THE DRAWINGS

FIG. 1 schematically shows the cross-sectional structure of a plate material made of the composite material according to the first embodiment of the present invention.

FIG. 2 schematically shows the cross-sectional structure of a plate material made of the composite material according to the second embodiment of the present invention.

FIG. 3 is the XRD analysis result of diamond powder coated with titanium (Ti) used in the manufacturing of a composite material according to Example 1 of the present invention.

FIG. 4 is a cross-sectional photograph of a composite plate material manufactured according to Example 1 of the invention.

FIG. 5A is a scanning electron microscope photograph of an interface layer of a composite material according to Example 1 of the present invention, and FIG. 5B is an EDS mapping result of the interface layer of the composite material of FIG. 5A.

FIG. 6A is a scanning electron microscope photograph of an interface layer of a composite material according to Example 2 of the present invention, and FIG. 6B is an EDS mapping result of the interface layer of the composite material of FIG. 6A.

FIG. 7A is a scanning electron microscope photograph of an interface layer of a composite material according to Example 3 of the present invention, and FIG. 7B is an EDS mapping result of the interface layer of the composite material of FIG. 7A.

FIG. 8A is a scanning electron microscope photograph of an interface layer of a composite material according to Example 4 of the present invention, and FIG. 8B is an EDS mapping result of the interface layer of the composite material of FIG. 8A.

FIG. 9 is a cross-sectional photograph of a structure in which a composite plate material manufactured according to Example 8 of the present invention is stacked with another plate material.

FIG. 10 is a scanning electron microscope photograph of an interface layer of a composite material according to Comparative Example 1.

FIG. 11 is a scanning electron microscope photograph of an interface layer of a composite material according to Comparative Example 2.

FIG. 12 is a scanning electron microscope photograph of an interface layer of a composite material according to Comparative Example 3.

FIG. 13 is a scanning electron microscope photograph of an interface layer of a composite material according to Comparative Example 4.

FIG. 15 shows a thermal conductivity (TC) and a thermal conductivity decrease rate (%) according to the content of TiC in a composite structure of titanium (Ti) and a titanium carbide constituting an interface.

DETAILED DESCRIPTION OF THE EXEMPLARY EMBODIMENTS

Figure 14:
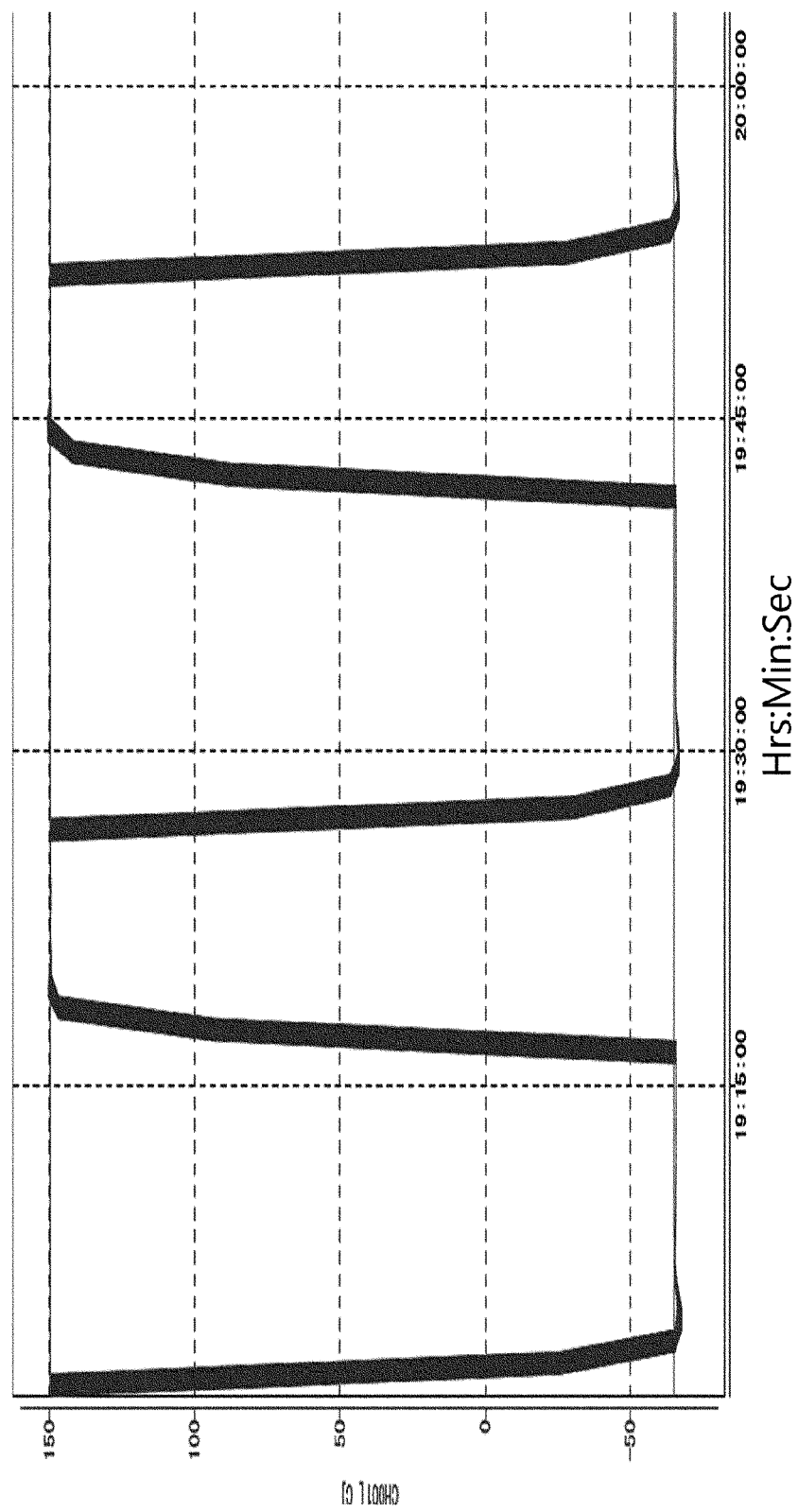
FIG. 14 shows a thermal cycle test profile according to the MIL-STD-883K-C standard.

Hereinafter, the configurations and operations of embodiments of the present invention will be described with reference to the accompanying drawings.

In the following description of the present invention, when it is determined that detailed descriptions of related known functions or configurations may unnecessarily obscure the gist of the present invention, the detailed descriptions will be omitted. In addition, when a portion is said to 'include' any component, it means that the portion may further include other components rather than excluding the other components unless otherwise stated.

First Embodiment

FIG. 1 schematically shows the cross-sectional structure of a plate material made of the composite material according to the first embodiment of the present invention.

As illustrated in FIG. 1, the composite material according to the first embodiment of the present invention has a metal matrix and a structure in which diamond particles are dispersed inside the metal matrix, wherein the metal matrix is composed of Cu, Ag, Al, Mg, or an alloy thereof, and the diamond particles are included at a volume ratio of 15% to 80%, and an interface layer including a composite structure of titanium (Ti) and a titanium carbide is formed in at least a portion between the metal matrix and the diamond particles, wherein a dendrite composed of the same metal as the metal matrix is formed in the composite structure of titanium (Ti) and a titanium carbide.

The 「alloy thereof」 refers to a Cu alloy, a Ag alloy, a Al alloy, and a Mg alloy, and each alloy may include Cu, Ag, Al, or Mg, which is a main element, in an amount of 80 wt % or greater, preferably 90 wt % or greater, more preferably 95 wt % or greater, and may include all known elements which may be alloyed with the main element as an alloying element, and may preferably include an alloy element whose thermal conductivity does not decrease significantly.

The 「dendrite composed of the same metal as the metal matrix」 is a structure of a shape in which a plurality of protrusions are formed while extending along the interface layer in the composite structure, and a plurality of island-shaped metals appear as connected or separated on a cross-sectional structure.

The dendrite formed in the composite structure of titanium (Ti) and a titanium carbide may be provided by coating the same metal as the metal matrix on the surface of diamond to be composited, but it is preferable that the dendrite has a shape formed by the penetration of the metal constituting the metal matrix into the composite structure of titanium (Ti) and a titanium carbide, since the shape may further increase binding force with the metal matrix.

The dendrite structure is preferably included in about 1 to 70% of the total area of the interface layer when viewed in a cross-section as shown in FIG. 4A. If it is less than 1%, the effect of the dendrite structure described above may not be significant, and if it exceeds 70%, it may be difficult to obtain the effect of maintaining binding force at a bonded surface between diamond particles and a copper base, which is provided by the composite structure of titanium and a titanium carbide. A more preferable area fraction of the dendrite structure is 5 to 50%.

When a thermal cycle is applied, the dendrite structure composed of the same metal as the metal matrix and formed inside the composite structure of titanium (Ti) and a titanium carbide relieves stress applied to the interface layer, the stress caused by a difference in thermal expansion coefficient between the metal matrix and the diamond, and maintains a bonding state between the metal matrix and the interface layer, so that heat dissipation properties with high reliability for a thermal cycle may be obtained.

When the diamond particles are included at a volume ratio of less than 15%, it is difficult to implement thermal conductivity and a thermal expansion coefficient required for high-power devices, and when included at a volume ratio of greater than 80%, thermal conductivity is better, but it is not easy to bind the diamond particles and a thermal expansion coefficient is lower, which are not preferable. In terms of productivity, thermal conductivity, and heat expansion properties, it is preferable that the volume ratio of the diamond particles is 15 to 60%, most preferably, 30 to 50%.

In the composite material according to the first embodiment, the interface layer may be formed at all interfaces between the metal matrix and the diamond particles. When there is a portion in which an interface layer including the dendrite described above is not formed, the degradation in reliability may be large, so that it is preferable that the interface layer is formed at all the interfaces between the metal matrix and the diamond particles.

In the composite material according to the first embodiment, the average thickness of the interface layer may be 100 nm to 10 μm. When the average thickness of the interface layer is less than 100 nm, it is difficult to obtain a composite structure of titanium (Ti) and a titanium carbide in which the dendrite desired in the present invention is formed, and when greater than 10 μm, the degradation in thermal conductivity worsens. A more preferable average thickness of the interface layer is 200 nm to 5 μm, and the most preferable average thickness of the interface layer is 200 nm to 2 μm.

The 「average thickness of the interface layers」 refers to an average value of values obtained by obtaining the minimum and maximum thickness for each composited diamond particle.

In the composite material according to the first embodiment, in the composite structure of titanium (Ti) and a titanium carbide, the content of the titanium carbide may be 10 to 45 wt %. When the content of the titanium carbide is less than 10 wt % in the entire composite structure, the thermal conductivity may be lowered, and when greater than 45 wt %, if a thermal cycle with a temperature difference of 150 to 300° C. is applied, the thermal conductivity may decrease by 10% or greater, so that it is preferable that the above range is maintained.

In the composite material according to the first embodiment, the titanium carbide may be TiC.

In the composite material according to the first embodiment, the size of the diamond particle is preferably 200 μm or greater, more preferably 300 μm or greater, and most preferably 400 μm or greater in terms of improving thermal conductivity.

In the composite material according to the first embodiment, the diamond particles dispersed in the metal matrix may be dispersed without being in contact with each other in a state in which the metal matrix is interposed therebetween.

This is because it is advantageous in maintaining heat dissipation properties when a heat cycle is applied to the composite material if the diamond particles dispersed in the metal matrix are dispersed without being in contact with each other in a state in which the metal matrix is interposed therebetween.

When tested according to the MIL-STD-883K-C standard, the composite material according to the first embodiment may have a decrease in thermal conductivity of 10% or less, more preferably 5% or less.

The MIL-STD-883K-C standard is a standard for evaluating the durability of an electronic device with respect to harmful effects of natural elements and conditions, including military and space operations, and the composite material according to the first embodiment of the present invention has reliability sufficient to be used for military and space operations.

The composite material according to the first embodiment has a plate shape, wherein the thermal conductivity in a thickness direction of the plate shape may be 500 W/mK or greater, and the thermal expansion coefficient in a plane direction of the plate shape may be $3\times10^{-6}$/K to $13\times10^{-6}$/K.

In the present invention, the 「thickness direction」 refers to a direction parallel to the thickness of a plate in a composite material in the shape of the plate, and the 「plane direction」 refers to a direction parallel to the plane of the plate.

The composite material according to the first embodiment may be used for a heat dissipation part of an electronic device such as a semiconductor device.

Second Embodiment

As illustrated in FIG. 2, the composite material according to the second embodiment of the present invention is characterized by having a stacked structure including a first layer composed of copper (Cu) or a copper (Cu) alloy, a second layer formed on the first layer and composed of an alloy including copper (Cu) and molybdenum (Mo), a third layer formed on the second layer and composed of the composite material according to the first embodiment, a fourth layer formed on the third layer and composed of an alloy including copper (Cu) and molybdenum (Mo), and a fifth layer formed on the fourth layer and composed of copper (Cu) or a copper (Cu) alloy.

The first layer, the third layer, and the fifth layer may be composed of pure copper (Cu) containing cooper in an amount of 99.9 wt % or greater, as well as of a copper (Cu) alloy containing various alloying elements in an amount of greater than 0.1 wt %, and the copper (Cu) alloy may include copper (Cu) in an amount of 80 wt % or greater, preferably 90 wt % or greater, and more preferably 95 wt % or greater in consideration of heat dissipation properties.

The second layer and the fourth layer are composed of an alloy including copper (Cu) and molybdenum (Mo), wherein it is preferable that copper (Cu): 5 to 40 wt % and molybdenum (Mo): 60 to 95 wt % are included. This is because when the content of copper (Cu) is less than 5 wt %, it is difficult to maintain good binding force with a copper (Cu) layer and the thermal conductivity in the thickness direction decreases, and when greater than 40 wt %, it is difficult to maintain the thermal expansion coefficient in the plane direction low.

When the thickness of each of the first layer, the third layer, and the fifth layer is maintained in the range of 10 to 1000 μm, it is advantageous in maintaining the thermal expansion coefficient in the plane direction of a heat dissipation plate in the range of $7\times10^{-6}$/K to $12\times10^{-6}$/K, which is similar to that of a ceramic material, and implementing the thermal conductivity in the thickness direction to be 400 W/mK or greater, so that it is preferable that the above range is maintained.

When the thickness of each of the second layer and the fourth layer is less than 10 μm, it is difficult to maintain the thermal expansion coefficient in the plane direction in the range of $7\times10^{-6}$/K to $12\times10^{-6}$/K, and when greater than 60 μm, it is difficult to maintain the thermal conductivity in the thickness direction in the range of 400 W/mK or greater, so that it is preferable that the thickness is maintained in the range of 10 μm to 60 μm.

Example 1

In Example 1, a composite material in which diamond particles are uniformly dispersed and composited in a copper (Cu) matrix was manufactured in the following manner.

First, diamond powder having a particle size of 200 μm was prepared. Diamond particles having a uniform size in which the size of the particles constituting the powder was within ±20% (more preferably within ±10%) of the representative value (average) were used.

Titanium (Ti) was coated on the surface of the diamond particles, and at this time, at an interface between the diamond and the titanium (Ti), carbon (C) constituting the diamond and a portion of the titanium (Ti) were reacted and formed a titanium carbide (TiC) as confirmed in FIG. 3. As the method for coating the titanium (Ti), a physical vapor deposition (PVD) method, a sputtering method, or a chemical vapor deposition (CVD) method may be used. At this time, the coating amount of Ti was set to about 0.4 wt % based on the weight of the total composite powder.

On the surface of the diamond particles coated with titanium (Ti), a copper (Cu) coating layer was formed using an electroless plating method. At this time, the thickness of the copper (Cu) coating layer was about 50 μm to 100 μm.

Thereafter, the diamond particles were press-molded to a thickness of 1.1 to 1.3 times the maximum size of the diamond particles within a pressure range in which the diamond particles were not broken. At this time, the molding pressure of the press was set to 200 MPa.

Through the press molding, a molded body in which the diamond particles formed a single layer was obtained. The obtained molding body was sintered at 1,000° C. using a spark plasma sintering method to manufacture a sheet composed of a Cu-diamond composite material having a cross-sectional structure as shown in FIG. 4.

Through a method in which the sheet manufactured as described above are stacked in various numbers such as 2, 3, 4, and 5 layers according to a required thickness, and then sintered and bonded, a heat dissipation substrate having various thicknesses and composed of a composite material in which diamond particles not in contact with each other are contained at a volume ratio of 15% to 80% was manufactured.

The heat dissipation substrate manufactured according to Example 1 had a diamond volume ratio of about 35%, and was manufactured to 55 mm×55 mm×1.1 mm (width×height×thickness).

Example 2

A copper-diamond composite plate was manufactured by a process mostly identical to that of Example 1. In the case of Example 2, the amount of Ti coated on the diamond particles was 0.5 wt %, unlike in Example 1, and as a result, a heat dissipation substrate having an interface layer with the dendrite of the present invention was obtained.

Example 3

A copper-diamond composite plate was manufactured by a process mostly identical to that of Example 1. In the case of Example 3, the amount of Ti coated on the diamond particles was 0.6 wt %, unlike in Example 1, and as a result, a heat dissipation substrate having an interface layer with the dendrite of the present invention was obtained.

Example 4

A copper-diamond composite plate was manufactured by a process mostly identical to that of Example 1. In the case of Example 4, the amount of Ti coated on the diamond particles was 0.7 wt %, unlike in Example 1, and as a result, a heat dissipation substrate having an interface layer with the dendrite of the present invention was obtained.

Example 5

A copper-diamond composite plate was manufactured by a process mostly identical to that of Example 1. In the case of Example 5, the amount of Ti coated on the diamond particles was 0.8 wt %, unlike in Example 1, and as a result, a heat dissipation substrate having an interface layer with the dendrite of the present invention was obtained.

Example 6

A copper-diamond composite plate was manufactured by a process mostly identical to that of Example 1. In the case of Example 6, the amount of Ti coated on the diamond particles was 0.9 wt %, unlike in Example 1, and as a result, a heat dissipation substrate having an interface layer with the dendrite of the present invention was obtained.

Example 7

A copper-diamond composite plate was manufactured by a process mostly identical to that of Example 1. In the case of Example 7, the amount of Ti coated on the diamond particles was 1.0 wt %, unlike in Example 1, and as a result, a heat dissipation substrate having an interface layer with the dendrite of the present invention was obtained.

Example 8

In Example 8, the Cu-diamond composite plate manufactured according to Example 1 was cladded to manufacture a heat dissipation substrate having a five-layer stacked structure.

First, a copper (Cu) plate material, a copper-molybdenum (Cu—Mo) plate material, a Cu-diamond composite plate material, a copper-molybdenum (Cu—Mo) plate material, and a copper (Cu) plate material were stacked in the above order, and then were sintered at 1,000° C. using a spark plasma sintering method to manufacture a Cu/Cu—Mo/Cu-diamond/Cu—Mo/Cu-stacked plate material having dimensions of 55 mm×55 mm×1.4 mm (width×length×thickness) with a cross-sectional structure as shown in FIG. 9.

The thickness of each layer constituting the stacked plate was 100 μm for the Cu layers, 50 μm for the Cu—Mo layers, and 1.1 mm for the Cu-diamond layer.

Comparative Example 1

A copper-diamond composite plate was manufactured by a process mostly identical to that of Example 1. In the case of Comparative Example 1, unlike in Example 1, a titanium coating layer was not formed on the surface of the diamond powder and only the copper plating was performed.

Comparative Example 2

A copper-diamond composite plate was manufactured by a process mostly identical to that of Example 1. In the case of Comparative Example 2, unlike in Example 1, the copper-diamond composite plate was manufactured by forming a titanium coating layer in a partially coated form to a relatively thin thickness of about 100 nm on the surface of the diamond powder, and using Ti in an amount of 0.1 wt %, but it was confirmed that no dendrite shape was formed at the interface.

Comparative Example 3

A copper-diamond composite plate was manufactured by a process mostly identical to that of Example 1. In the case of Comparative Example 3, unlike in Example 1, the copper-diamond composite plate was manufactured by forming a coating layer in a partially coated form to a relatively thin thickness of about 100 nm, and using Ti in an amount of 0.2 wt %, but it was confirmed that no dendrite shape was formed at the interface.

Comparative Example 4

A copper-diamond composite plate was manufactured by a process mostly identical to that of Example 1. In the case of Comparative Example 4, unlike in Example 1, the titanium coating was performed to a relatively thick thickness of about 500 nm on the surface, and the SPS sintering was performed at a temperature which was about 100° C. lower than that of Example 1.

Microstructure

Microstructures of the composite plates manufactured according to Examples 1 to 4 and Comparative Examples 1 to 4 were observed with a scanning electron microscope.

FIG. 5A is a scanning electron microscope photograph of an interface layer of the composite material according to Example 1 of the present invention, and FIG. 5B is an EDS mapping result of the interface layer of the composite material of FIG. 5A, and FIG. 6A is a scanning electron microscope photograph of an interface layer of the composite material according to Example 2 of the present invention, and FIG. 6B is an EDS mapping result of the interface layer of the composite material of FIG. 6A, and FIG. 7A is a scanning electron microscope photograph of an interface layer of the composite material according to Example 3 of the present invention, and FIG. 7B is an EDS mapping result of the interface layer of the composite material of FIG. 7A, and FIG. 8A is a scanning electron microscope photograph of an interface layer of the composite material according to Example 4 of the present invention, and FIG. 8B is an EDS mapping result of the interface layer of the composite material of FIG. 8A.

FIGS. 10 to 13 are respectively scanning electron microscope photographs of the composite plate materials manufactured according to Comparative Examples 1 to 4.

As confirmed in FIG. 5A and FIG. 5B, in the composite plate material manufactured according to Example 1 of the present invention, it can be seen that an interface layer in which a composite structure of titanium (the region marked "Ti" in FIG. 5A) and a titanium carbide (the region marked "TiC" in FIG. 5A) is formed between diamond particles (the region marked "C" in FIG. 5A) and a copper matrix (the region marked "Cu" in FIG. 5A).

In addition, a copper dendrite structure having a plurality of protrusions along the interface layer is formed inside the interface layer of the composite plate material according to Example 1 by the penetration of copper (Cu) constituting the metal matrix into the composite structure.

As confirmed in FIGS. 6 to 8, a copper dendrite structure (which appears to be an island structure on a cross-section) having a plurality of protrusions along the interface layer is also formed inside the interface layer of the composite plate material according to each of Examples 2 to 4 by the penetration of copper (Cu) constituting the metal matrix into the composite structure.

In comparison, as confirmed in FIG. 10, in the case of Comparative Example 1, titanium coating was not performed on the surface of the diamond particles in Comparative Example 1, so that a boundary layer composed of titanium and a titanium carbide was not formed between the copper matrix and the diamond particles.

In addition, in the case of Comparative Example 2, as confirmed in FIG. 11, the interface layer has a titanium structure in the form of an island between titanium (Ti) and a titanium carbide (Ti) on a cross-sectional structure, and a copper dendrite structure protruding from the copper matrix is not formed inside the composite structure.

In addition, in the case of Comparative Example 3, as confirmed in FIG. 12, an interface layer having a composite structure of titanium and a titanium carbide is formed between the copper matrix and the diamond particles. Similar to the case of Example 1 of the present invention, the interface layer of Comparative Example 3 has a titanium structure composed of relatively more structures than the titanium carbide (TiC) structure, but a copper dendrite structure protruding from the copper matrix is not formed inside the composite structure.

In addition, in the case of Comparative Example 4, as confirmed in FIG. 13, an interface layer having a composite structure of titanium and a titanium carbide is formed between the copper matrix and the diamond particles, but a copper dendrite structure is not formed inside the interface layer.

Measurement of Thermal Conductivity and Thermal Expansion Coefficient

The thermal conductivity and thermal expansion coefficient of each of the composite plate material manufactured according to each of Examples 1 to 4 and Comparative Examples 1 to 4 were measured.

The thermal conductivity was measured with a thermal conductivity measuring device using a scintillation method (a laser light flash method) with respect to the thickness direction of the composite plate material. In addition, as for the thermal expansion coefficient, thermal expansion coefficients of the width and the height of a plate material manufactured in a square shape were measured with a thermal expansion coefficient measuring device (a dilatometer). Table 1 below shows the measured thermal conductivity and thermal expansion coefficients (average values of the width and height values of the plate material).

TABLE 1

| Samples | Thermal conductivity of plate material in thickness direction (W/mK) | Thermal expansion coefficient of place material in plane direction ($\times 10^{-6}$/K) 25 to 100° C. |
|---|---|---|
| Example 1 | 676 | 10.5 |
| Example 2 | 669 | 10.4 |
| Example 3 | 650 | 10.4 |
| Example 4 | 631 | 10.6 |
| Example 5 | 612 | 10.5 |
| Example 6 | 604 | 10.4 |
| Example 7 | 596 | 10.5 |
| Example 8 | 591 | 10.6 |

TABLE 1-continued

| Samples | Thermal conductivity of plate material in thickness direction (W/mK) | Thermal expansion coefficient of place material in plane direction (×10⁻⁶/K) 25 to 100° C. |
|---|---|---|
| Comparative Example 1 | 712 | 10.4 |
| Comparative Example 2 | 710 | 10.7 |
| Comparative Example 3 | 690 | 10.3 |
| Comparative Example 4 | 683 | 10.2 |

Since composite plate material according to Example 1 of the present invention is composed only of a copper-diamond composite plate material, the thermal conductivity in the thickness direction of the composite plate material was excellent at 676 W/mK.

In addition, the composite plate materials according to Examples 2 to 7 also have a good thermal conductivity of 596 to 669 W/mK, and most of Examples exhibited excellent thermal conductivity of 600 W/mK or greater.

Meanwhile, the composite plate material according to Example 8 was composed of a Cu/Cu—Mo/Cu-diamond/Cu—Mo/Cu stacked structure, and thus, had a low thermal conductivity in the thickness direction of 591 W/mK.

In the case of Comparative Examples 1 to 4, the thermal conductivity in the thickness direction was somewhat excellent compared to that of Examples of the present invention, and the thermal expansion coefficient in the plane direction was similar to that of Example 1.

Thermal Cycle Test

A thermal cycle test was performed on the composite plate material manufactured according to each of Example 1, Example 7, and Comparative Examples 1 to 4 with a profile as shown in FIG. 14 and Table 2.

TABLE 2

| Temperature range | Number of cycles | Heating time (min) | Cooling time (min) | Notes |
|---|---|---|---|---|
| −65 to 150° C. | 1000 | 10 | 10 | MIL-STD-883K-C |

Through the test in Table 2 above, the decrease rate in thermal conductivity was measured. The decrease rate in thermal conductivity was calculated by [Equation 1] below, and Table 3 below shows the results of the performed thermal cycle test.

Thermal conductivity decrease rate (%)=(Thermal conductivity before heating−Thermal conductivity after heating)/(Thermal conductivity before heating)×100    [Equation 1]

TABLE 3

| Samples | TC before test (W/mK) | After −65 to 150° C., and 1000 cycle test | |
|---|---|---|---|
| | | TC (W/mK) | ΔTC (%) |
| Example 1 | 714 | 710 | 0.56 |
| Example 7 | 596 | 595 | 0.17 |
| Comparative Example 1 | 712 | 322 | 55 |
| Comparative Example 2 | 710 | 433 | 39 |
| Comparative Example 3 | 690 | 469 | 32 |
| Comparative Example 4 | 683 | 581 | 15 |

As confirmed in Table 3, the composite plate material according to each of Examples 1 and 7 of the present invention hardly had any decrease in thermal conductivity. That is, excellent reliability was exhibited under the condition of MIL-STD-883K-C, which can be said to be a very harsh cycle condition.

In comparison, Comparative Examples 1 to 4 had a decrease in thermal conductivity in the thickness direction by 15% to 55%. That is, the reliability thereof in a use environment in which a thermal cycle is repeatedly performed was significantly lower than that of a product according to an embodiment of the present invention.

Titanium Carbide of Interface Layer and Thermal Conductivity

FIG. 15 shows a thermal conductivity (TC) and a thermal conductivity decrease rate (%) according to the content ratio of TiC in a composite structure of titanium (Ti) and the titanium carbide (TiC) constituting an interface layer. In addition, a "TC drop" refers to the results of a test performed under the acceleration conditions of a temperature range of −5° C. to 350° C., heating for 10 minutes, cooling for 10 minutes, the number of cycles of 100.

As shown in FIG. 15, when the ratio of a titanium carbide (TiC) in an interface layer is low, and if a dendrite structure protruding from a metal matrix is formed inside the interface layer, there is little decrease in thermal conductivity (data marked as "TC drop" in the drawing) caused by a thermal cycle, but the thermal conductivity level is relatively low due to the lack of the titanium carbide (TiC). When the ratio of a titanium carbide (TiC) in an interface layer is high, a dendrite structure protruding from a metal matrix is not formed inside the interface layer, resulting in a decrease in thermal conductivity.

Therefore, in an interface layer including a composite structure of titanium (Ti) and a titanium carbide (TiC), it is preferable that the content of the titanium carbide (TiC) is 1 wt % to 45 wt % (the region marked in blue in FIG. 15) in the combined weight of the titanium (Ti) and the titanium carbide (TiC), and more preferably, the content of the titanium carbide (TiC) is 10 wt % to 45 wt %.

What is claimed is:

1. A composite material comprising a metal matrix and a structure in which diamond particles are dispersed inside the metal matrix, wherein:
   the metal matrix consists of copper (Cu), and the diamond particles are included at a volume ratio of 15% to 80%; and
   an interface layer including a composite structure of titanium (Ti) and a titanium carbide is formed in at least a portion between the metal matrix and the diamond particles,
   wherein a dendrite composed of the same metal as the metal matrix is formed in the composite structure of titanium (Ti) and a titanium carbide, and wherein an average thickness of the interface layer is 200 nm to 5 μm.

2. A material having a stacked structure comprising:
- a first layer composed of copper (Cu) or a copper (Cu) alloy;
- a second layer formed on the first layer, and composed of an alloy containing copper (Cu) and molybdenum (Mo);
- a third layer formed on the second layer, and composed of the composite material described in claim 1;
- a fourth layer formed on the third layer, and composed of an alloy containing copper (Cu) and molybdenum (Mo); and
- a fifth layer formed on the fourth layer, and composed of copper (Cu) or a copper (Cu) alloy.

3. The composite material of claim 1, wherein in the composite structure of titanium (Ti) and a titanium carbide, the content of the titanium carbide is 1 wt % to 45 wt %.

4. The composite material of claim 1, wherein the dendrite is formed by the penetration of a metal constituting the metal matrix into the composite structure of titanium (Ti) and a titanium carbide.

5. The composite material of claim 1, wherein when the composite material is tested according to the MIL-STD-883K-C standard, the decrease in thermal conductivity is 10% or less.

6. The composite material of claim 1, wherein the composite material has a plate shape, wherein:
- the thermal conductivity in a thickness direction of the plate shape is 500 W/mK or greater; and
- the thermal expansion coefficient in a plane direction of the plate shape is $3\times10^{-6}$/K to $13\times10^{-6}$/K at 25° C. to 200° C.

7. A heat dissipation part comprising the composite material described in claim 1.

8. The material of claim 2, wherein in the composite structure of titanium (Ti) and a titanium carbide, the content of the titanium carbide is 1 wt % to 45 wt %.

9. The material of claim 2, wherein the dendrite is formed by the penetration of a metal constituting the metal matrix into the composite structure of titanium (Ti) and a titanium carbide.

10. The material of claim 2, wherein when the composite material is tested according to the MIL-STD-883K-C standard, the decrease in thermal conductivity is 10% or less.

11. The material of claim 2, wherein the composite material has a plate shape, wherein:
- the thermal conductivity in a thickness direction of the plate shape is 500 W/mK or greater; and
- the thermal expansion coefficient in a plane direction of the plate shape is $3\times10^{-6}$/K to $13\times10^{-6}$/K at 25° C. to 200° C.

12. A heat dissipation part comprising the material described in claim 2.

* * * * *